United States Patent
Casati

(10) Patent No.: US 10,856,157 B2
(45) Date of Patent: Dec. 1, 2020

(54) SUPPORT OF PACKET DATA CONNECTIVITY IN A MOBILE NETWORK

(71) Applicant: Alcatel Lucent, Boulogne Billancourt (FR)

(72) Inventor: Alessio Casati, West Molesey (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/431,026

(22) PCT Filed: Sep. 25, 2013

(86) PCT No.: PCT/EP2013/069933
§ 371 (c)(1),
(2) Date: Mar. 25, 2015

(87) PCT Pub. No.: WO2014/048967
PCT Pub. Date: Apr. 3, 2014

(65) Prior Publication Data
US 2015/0249931 A1    Sep. 3, 2015

(30) Foreign Application Priority Data

Sep. 26, 2012  (EP) .................................... 12306166

(51) Int. Cl.
*H04M 1/66* (2006.01)
*H04W 24/04* (2009.01)
(Continued)

(52) U.S. Cl.
CPC ......... *H04W 24/04* (2013.01); *H04L 63/0853* (2013.01); *H04W 12/0602* (2019.01);
(Continued)

(58) Field of Classification Search
CPC . H04W 36/0079; H04W 36/12; H04W 36/14; H04W 36/125; H04W 36/305; H04W 48/18; H04W 8/26
See application file for complete search history.

(56) References Cited

U.S. PATENT DOCUMENTS 8,571,550 B2   10/2013  Horn et al.
8,909,294 B2   12/2014  Keevill et al.
(Continued)

FOREIGN PATENT DOCUMENTS

CN    101278577 A    1/2008
CN    101925037 A    12/2010
(Continued)

OTHER PUBLICATIONS

"3rd Generation Partnership Project; Technical Specification Group Services and System Aspects; Local IP Access and Selected IP Traffic Offload (LIPA-SIPTO) (Release 10)," 3GPP TR 23.829, V10.0.1, pp. 1-43, XP050554389, (Oct. 2011).
(Continued)

*Primary Examiner* — Shantell L Heiber
(74) *Attorney, Agent, or Firm* — Fay Sharpe LLP

(57) ABSTRACT

In an embodiment, there is provided a method for the support of packet data connectivity in a mobile network, said mobile network comprising a Radio Access network RAN and a Core Network CN, said method including, in case no connectivity is available between a RAN node and the Core Network, support of said packet data connectivity in a mode referred to as resilient mode wherein said packet data connectivity is provided locally by said RAN node to at least one User Equipment UE in the coverage of said RAN node, referred to as authorized UE, that is authorized to operate in said resilient mode.

10 Claims, 4 Drawing Sheets

(51) Int. Cl.
  *H04L 29/06* (2006.01)
  *H04W 76/50* (2018.01)
  *H04W 12/06* (2009.01)
  *H04W 88/16* (2009.01)
  *H04W 84/04* (2009.01)
  *H04W 88/08* (2009.01)
  *H04W 88/10* (2009.01)

(52) U.S. Cl.
  CPC ....... *H04W 12/0609* (2019.01); *H04W 76/50* (2018.02); *H04W 84/042* (2013.01); *H04W 88/08* (2013.01); *H04W 88/10* (2013.01); *H04W 88/16* (2013.01)

(56) References Cited

U.S. PATENT DOCUMENTS

| | | | |
|---|---|---|---|
| 2005/0192005 A1* | 9/2005 | Blom | H04W 24/04 455/432.1 |
| 2007/0064948 A1 | 3/2007 | Tsirtsis et al. | |
| 2007/0070933 A1* | 3/2007 | Chan | H04W 92/12 370/328 |
| 2009/0046573 A1* | 2/2009 | Damnjanovic | H04J 11/0093 370/216 |
| 2011/0032816 A1* | 2/2011 | Isaksson | H04W 48/12 370/225 |
| 2011/0058480 A1* | 3/2011 | Dahlen | H04W 48/06 370/237 |
| 2011/0069618 A1* | 3/2011 | Wong | H04W 76/022 370/244 |
| 2012/0224483 A1* | 9/2012 | Babiarz | H04L 43/0847 370/232 |
| 2012/0238324 A1* | 9/2012 | Keevill | H04L 12/5692 455/561 |
| 2013/0007196 A1* | 1/2013 | Alfano | H04W 4/00 709/217 |
| 2013/0212637 A1* | 8/2013 | Guccione | H04L 63/102 726/1 |

FOREIGN PATENT DOCUMENTS

| | | |
|---|---|---|
| CN | 102308601 A | 4/2012 |
| EP | 1 841 142 A1 | 3/2007 |
| EP | 2 096 888 A1 | 9/2009 |
| WO | WO 2011/109518 A1 | 9/2011 |

OTHER PUBLICATIONS

International Search Report for PCT/EP2013/069933 dated Jan. 28, 2014.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Stage 2 (Release 10)," 3GPP TS 36.300, V10.4.0, pp. 1-194, (Jun. 2011).

* cited by examiner

SUPPORT OF PACKET DATA CONNECTIVITY IN A MOBILE NETWORK

The present invention generally relates to mobile communication networks and systems.

Detailed descriptions of mobile communication networks and systems can be found in the literature, such as in particular in Technical Specifications published by standardization bodies such as for example 3GPP ($3^{rd}$ Generation Partnership Project).

A typical example of packet mobile communication system is Evolved Packet System EPS (specified in particular in 3GPP TS 23.401).

An EPS network comprises a Core Network (CN) called Evolved Packet Core called EPC that can be accessed by a Radio Access Network (RAN) called E-UTRAN. An EPS network provides connectivity (referred to as Packet Data Network PDN connectivity, or IP connectivity) to User Equipments (UE).

Figure 1:
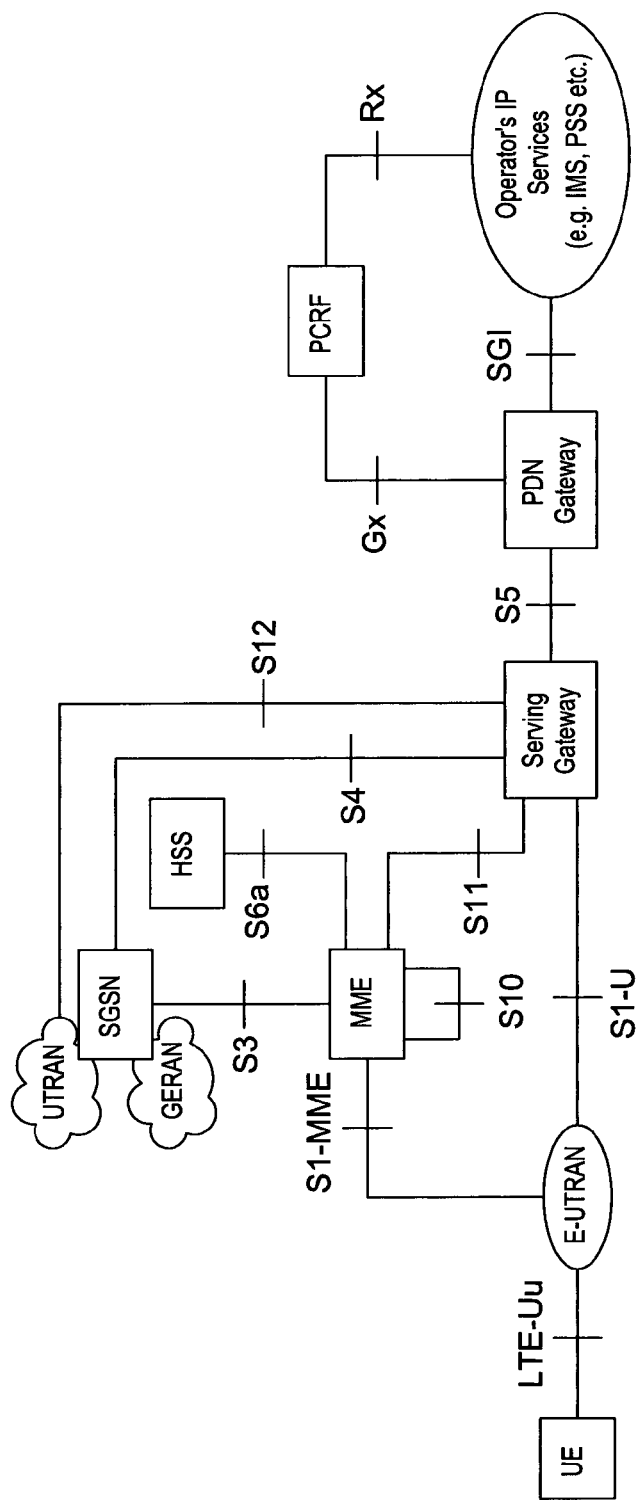

An example of architecture of EPS network is recalled in FIG. 1 (taken from 3GPP TS 23.401), showing the main network nodes and interfaces between network nodes. Interfaces between EPS network nodes include, in particular, in the control plane, S1-MME interface between E-UTRAN node called eNodeB (eNB) and EPC node called Mobility Management Entity (MME), and in the user plane, S1-U interface between E-UTRAN node called eNodeB (eNB) and EPC node called Serving Gateway (SGW).

As recognized by the inventor, and as will also be described later, current mode of operation of EPS does not allow users under coverage of an E-UTRAN node to communicate in case no connectivity is available between this E-UTRAN node and EPC, in particular when no connectivity is available over S1-MME interface (such as when transport links at the S1-MME interface are severed, or when MMEs are unavailable for some reason) and when S1-U interface is unavailable (such as when transport links at the S1-U interface are severed, or when SGWs are unavailable for some reason).

Backup connectivity to the core network could of course be used in such cases, but such backup connectivity may in turn be damaged, so there is currently no effective solution to such problem.

There is a need to solve such problem, in particular there is a need to allow some critical communications (such as for example Public Safety communications) to be established in such cases. More generally, there is a need to improve support of packet data connectivity in such mobile networks and systems.

Embodiments of the present invention in particular address such needs.

These and other objects are achieved, in one aspect, by a method for the support of packet data connectivity in a mobile network, said mobile network comprising a Radio Access network RAN and a Core Network CN, said method including, in case no connectivity is available between a RAN node and the Core Network, support of said packet data connectivity in a mode referred to as resilient mode wherein said packet data connectivity is provided locally by said RAN node to at least one User Equipment UE in the coverage of said RAN node, referred to as authorized UE, that is authorized to operate in said resilient mode.

These and other objects are achieved, in other aspects, by entities configured to carry out such method, said entities including, in particular (though not exclusively), User Equipment UE, and RAN node or base station (such as eNodeB for E-UTRAN).

Figure 2:
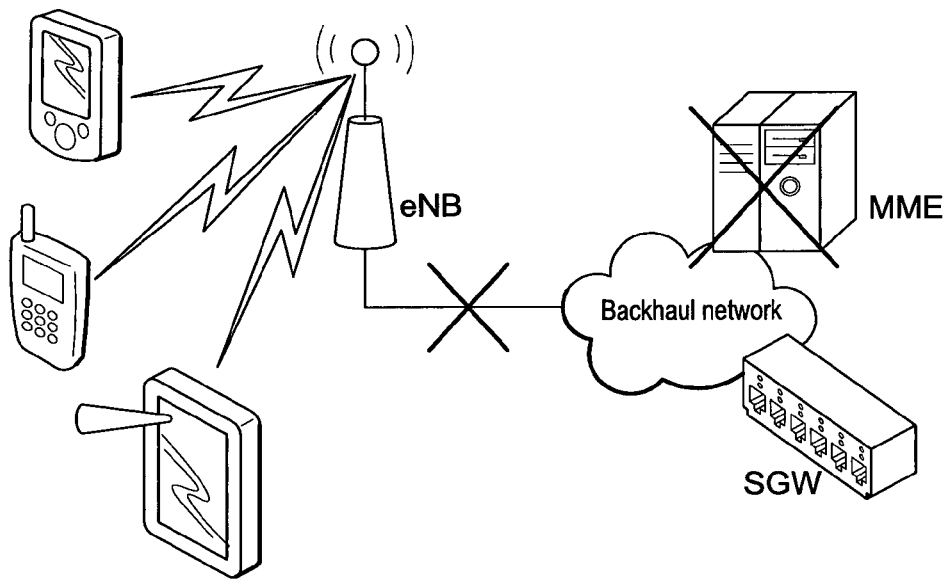
Figure 3:
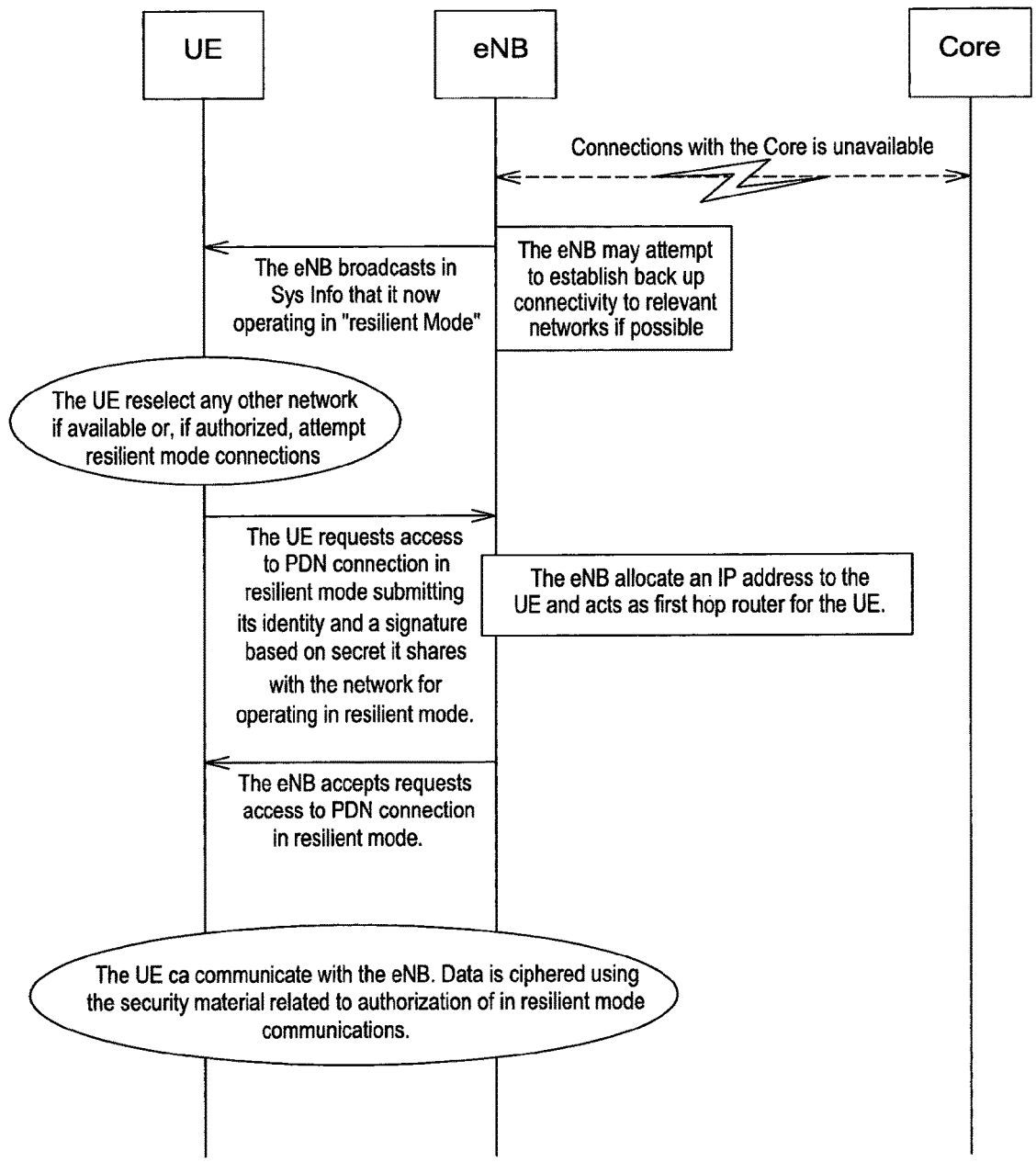
Figure 4:
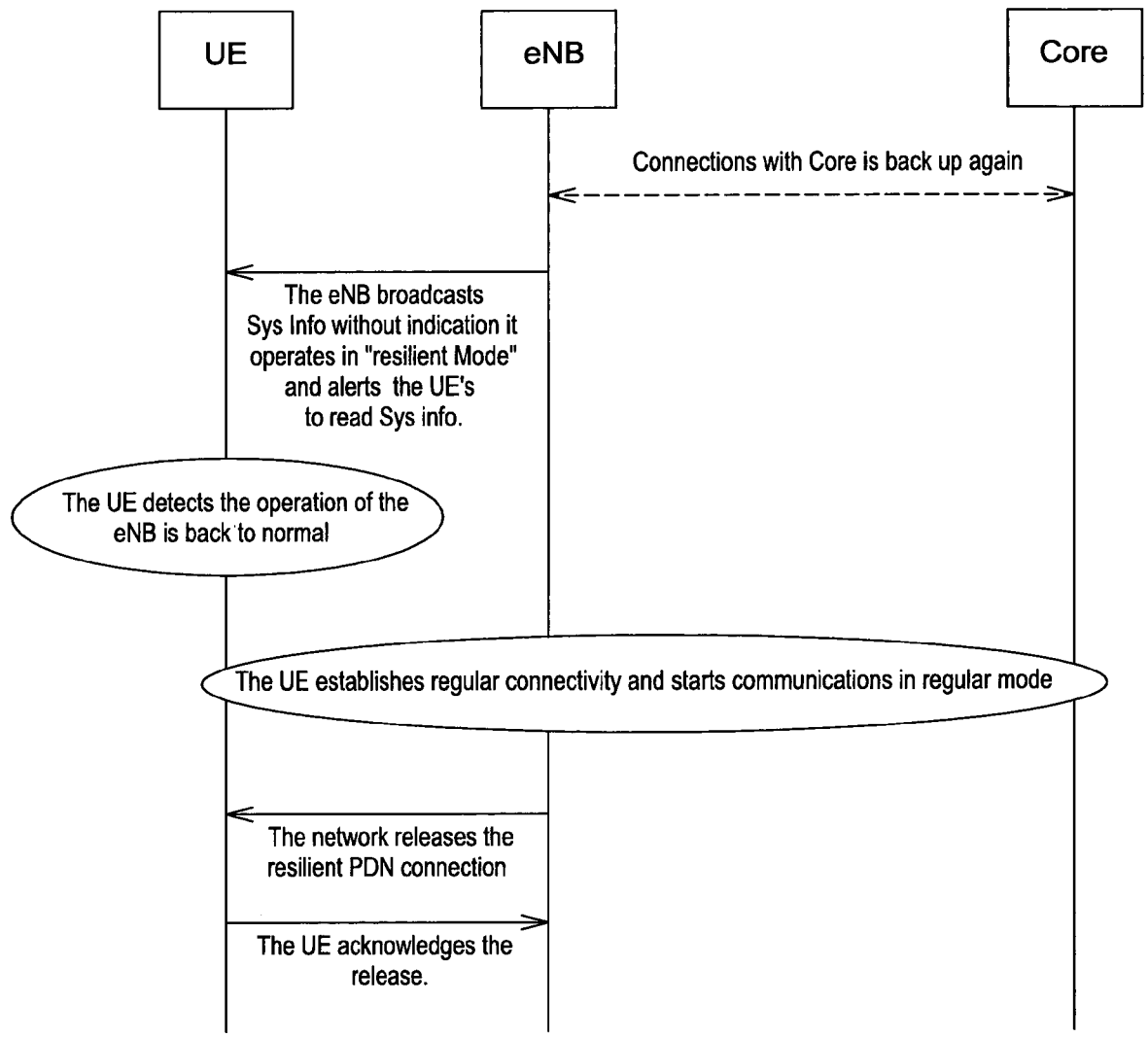

Some embodiments of apparatus and/or methods in accordance with embodiments of the present invention are now described, by way of example only, and with reference to the accompanying drawings, in which:

FIG. 1 is intended to recall an example of architecture for EPS network,

FIG. 2 is intended to illustrate, in a simplified way, an example of scenario in which embodiments of the present invention may be used, FIG. 3 is intended to illustrate, in a simplified way, an example of procedure in resilient mode, according to embodiments of the present invention, FIG. 4 is intended to illustrate, in a simplified way, an example of procedure for returning to normal mode of operation after use of resilient mode, according to embodiments of the present invention.

Embodiments of the present invention will be more detailed in the following, by way of example for EPS. However it should be understood that the present invention is not limited to EPS, and could apply as well to systems other than EPS.

In current mode of operation of EPS, an UE establishes a communication using connectivity to MME which holds a subscription profile and terminates Non Access Stratum (NAS) signaling needed to establish PDN connections. The MME also makes sure the signaling is handled securely using subscriber-specific credentials.

The MME then controls the establishment of an end to end bearer involving the eNB (the RAN node) the SGW (Serving Gateway, acting as access aggregator) and the PGW (PDN Gateway, terminating the connection to the PDN and providing basic or advanced IP services, depending on implementation).

In some applications, like for example Critical Communications for Public safety or mission critical commercial use like railroad communications, Oil and energy sectors purposes, it is important to allow users under a cell (or an eNB) coverage to be able to communicate e.g. with one another even though the connectivity to the rest of the network is severed.

Using the current EUTRAN as defined in standards this is not possible as, as soon as the backhaul connection to the network is severed, the base station cannot provide service as control plane signaling handling via the core node (MME) is unavailable the core is unavailable and end to end bearer connectivity to a PGW is lost.

Embodiments of the present invention in particular enable to solve such problem.

FIG. 2 is intended to illustrate, in a simplified way, an example of scenario in which embodiments of the present invention may be used, For example, it may be assumed that the eNB looses connectivity to the core network either because the transport links to the core are severed or because the core network is unavailable for some reason, as outlined in FIG. 2.

In an embodiment, the eNB detects lost connectivity to the core network.

In an embodiment, upon detection of lost connectivity to the core network, the eNB broadcasts to the User Equipments under its coverage the fact that the connectivity is lost, or that the eNB is now operating in resilient mode.

This may trigger: the UEs that can use resilient base station (eNB) procedure (i.e. that can operate in resilient mode) to start the procedure applicable to resilient base station (i.e. to start operating in resilient mode) or reselect another network, for the other UEs they should reselect another network or refrain from attempting to contact the eNB until they receive positive indication there is full service again (e.g. when the eNB stops advertising it is operating in resilient mode).

In order to avoid synchronized attempts to access the network again, a UE that detect the service is re-established may apply a random backoff timer after it detects service availability, before attempting to access the network services again.

In an embodiment, in resilient mode, the eNB supports communications establishment for UEs under its coverage that are authorized to operate in resilient mode, in particular the eNB supports communications between such UEs under its coverage.

In an embodiment, support of resilient mode by eNB includes support of Non Access Stratum procedures local to the eNB.

In an embodiment, support of resilient mode by eNB includes support of local routing functions between devices which establish local PD (Packet Data) connections with the eNB while in "resilient mode". Optionally, the eNB may support backup connection e.g. to the Internet.

FIG. 3 is intended to illustrate, in a simplified way, an example of procedure in resilient mode, according to embodiments of the present invention Some or all of following steps (illustrated in FIG. 3) may be performed, following a detection that connection between eNB and Core Network is unavailable. Following such detection, the eNB may (although not necessary) attempt to establish backup connectivity to relevant networks if possible.

Upon detection of lost connectivity to the core network, the eNB starts broadcasting to the UEs, e.g. in system information, that the eNB is operating in resilient mode.

At this point the UEs that do not support resilient mode operation or are not authorized (or configured) to support resilient mode may reselect another network if possible.

Those UE's that can support resilient mode operation and are authorized to support resilient mode should be able to establish communications with the eNB using resilient mode procedures enabling PD (Packet Data) connections local to the eNB to be established and therefore offering a basic level of packet connectivity which enables data to be exchanged locally with other UE's (or , if the eNB supports a form of backup connectivity to the Internet, globally).

An UE able to use resilient mode procedures sends to the eNB a request for packet data connectivity establishment in resilient mode. In this request the UE may submit its identity and a signature based on secret it shares with the network for operation in resilient mode.

Upon reception of such request, the eNB allocates an IP address to the UE and acts as a first hop router for the UE. In other words, the eNB is seen as a first hop router for the UE in resilient mode packet data connection.

The eNB responds to the request for packet data connectivity establishment in resilient mode. In the considered example, the UE is authorized to operate in resilient mode, and the eNB accepts this request.

The UE can then communicate with the eNB. Data exchanged during communication can be ciphered using security material related to authorization of resilient mode communications.

In an embodiment, the eNB enables such access to local routing capabilities in resilient mode only when the detection of failure to connect to any in service core nodes is detected.

In an embodiment, the UEs need to be authorized using special credentials that can be stored in the USIM for resilient mode only for special subscribers that can have right of access using these credential. The eNB shall be able to authenticate the Users using these credential locally and to also establish ciphered communications using the related security material.

FIG. 4 is intended to illustrate, in a simplified way, an example of procedure for returning to normal mode of operation after use of resilient mode, according to embodiments of the present invention.

Some or all of following steps (illustrated in FIG. 4) may be performed, following a detection that connection between eNB and Core Network is available again.

As the eNB detects connectivity with the core is available again (e.g. by attempting periodically to establish S1 interface with known MMEs) the eNB removes the System information indicating service is unavailable and resilient mode available. The eNB may also alert the UEs to read the system information.

Under these conditions the UEs that are using resilient mode detect the mode of operation of the eNB is back to normal and revert to normal service by attaching to the EPC (Evolved Packet core) and getting normal PDN connectivity.

When this is successful the network releases resilient mode connections for UEs that are attached in normal mode and also, if the eNB detects stale resilient mode connections, it will clear them locally after a sufficiently long timeout.

In one aspect, there is provided a method for the support of packet data connectivity in a mobile network comprising a Radio Access network RAN and a Core Network CN.

Various embodiments are provided, which may be taken alone or in combination, according to various combinations.

In an embodiment, said method includes, in case no connectivity is available between a RAN node and the Core Network, support of said packet data connectivity in a mode referred to as resilient mode wherein said packet data connectivity is provided locally by said RAN node to at least one User Equipment UE in the coverage of said RAN node, referred to as authorized UE, that is authorized to operate in said resilient mode.

In an embodiment, said method comprises:
said RAN node detecting that no connectivity is available between said RAN node and CN.

In an embodiment, said method comprises:
in case no connectivity is available between said RAN node and CN, said RAN node broadcasting information indicating that said RAN node is operating in resilient mode.

In an embodiment, said method comprises:
in case no connectivity is available between said RAN node and CN, said RAN node broadcasting, in system information, information indicating that said RAN node is operating in resilient mode.

In an embodiment, said method comprises:
upon learning that said RAN node is operating in resilient mode, an UE under coverage of said RAN node, that is not authorized to operate in said resilient mode reselecting another mobile network or refraining from attempting to contact said RAN node.

In an embodiment, said method comprises:
upon learning that said RAN node is operating in resilient mode, an authorized UE under coverage of said RAN node starting to operate in said resilient mode.

In an embodiment, said method includes:
a Subscriber Identification Module associated with an authorized UE storing credentials related to said operation in resilient mode.

In an embodiment:
said credentials include authorization and/or security material, for user authentication and/or user data ciphering, for said operation in resilient mode.

In an embodiment, said method comprises:
said mobile network managing credentials related to said operation in resilient mode, stored in a Subscriber Identification Module associated with an authorized UE.

In an embodiment, said method comprises:
a CN node having control plane functions including, in signaling sent to an authorized UE via said RAN node when connectivity is available between said RAN node and CN, information for managing credentials related to said operation in resilient mode stored in a Subscriber Identification Module associated with said authorized UE.

In an embodiment:
said signaling includes Mobility Management signaling sent by said CN node to said UE during Attach or Tracking Area Update procedure.

In an embodiment, said method comprises:
in said resilient mode, said RAN node authenticating an UE under its coverage, using credentials related to said operation in resilient mode, locally.

In an embodiment, said method comprises:
in said resilient mode, an authorized UE sending to said RAN node a request for packet data connection establishment, said request including an UE identity and a signature based on secret shared by said UE and said mobile network for said operation in resilient mode.

In an embodiment, said method comprises:
in said resilient mode, an authorized UE ciphering data transmitted to said RAN node, using security material related to operation in said resilient mode.

In an embodiment, said method comprises:
in said resilient mode, said RAN node ciphering data transmitted to an authorized UE, using security material related to operation in said resilient mode.

In an embodiment, said method comprises:
upon reception from an authorized UE of a request for packet data connectivity in resilient mode, said RAN node allocating an IP address to said UE.

In an embodiment, said method comprises:
upon reception from an authorized UE of a request for PDN connectivity in resilient mode, said RAN node acting as a first hop router for said UE.

In an embodiment, said method comprises:
while operating in resilient mode, said RAN node detecting if connectivity between said RAN node and CN is available again.

In an embodiment, said method comprises:
in case connectivity between said RAN node and CN is available again, said RAN node stopping broadcasting information indicating that said RAN node is operating in resilient mode.

In an embodiment, said method comprises:
upon learning that said RAN node is no longer operating in resilient mode, an authorized UE under coverage of said RAN node reverting to normal mode of operation.

In an embodiment, said method comprises:
upon learning that said RAN node is no longer operating in resilient mode, an authorized UE under coverage of said RAN node reverting to normal mode of operation, after a backoff timer elapses.

In an embodiment, said method comprises:
upon learning that said RAN node is no longer operating in resilient mode, an UE under coverage of said RAN attempting access to said mobile network using normal mode of operation, after a backoff timer elapses.

In other aspects, there are provided entities configured for carrying out such method, said entities including in particular (though not exclusively), User Equipment UE, and RAN node or base station (such as eNodeB for E-UTRAN).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising:
at least one processor; and
at least one memory including computer program code;
the at least one memory and the computer program code configured to, with the at least one processor, cause the apparatus at least to perform:
determining if information is received indicating operation of a serving radio access network node in a mode referred to as resilient mode wherein, in case connectivity between said serving radio access network node and a core network is lost, support of packet data connectivity for public safety communications includes providing routing functions locally by said serving radio access network node to apparatuses in the coverage of said serving radio access network node that are authorized to operate in said resilient mode,
determining if operation in said resilient mode is authorized; and,
when information is received indicating operation of said serving radio access network node in said resilient mode, and if said operation in said resilient mode is authorized, starting to operate in said resilient mode.

2. The apparatus according to claim 1, the at least one memory and the computer program code configured to, with the at least one processor, cause the apparatus at least to perform:
using credentials related to said operation in resilient mode, stored in a subscriber identification module associated with said apparatus.

3. The apparatus according to claim 1, the at least one memory and the computer program code configured to, with the at least one processor, cause the apparatus at least to perform:
using credentials related to said operation in resilient mode for authentication of said user apparatus in said resilient mode.

4. The apparatus according to claim 1, the at least one memory and the computer program code configured to, with the at least one processor, cause the apparatus at least to perform:

reverting to a normal mode of operation in case connectivity between said radio access network node and core network is recovered.

5. The apparatus according to claim 1, the at least one memory and the computer program code configured to, with the at least one processor, cause the apparatus at least to perform:
receiving said information indicating operation in said resilient mode, in broadcast system information.

6. A method comprising:
determining if information is received indicating operation of a serving radio access network node in a mode referred to as resilient mode wherein, in case connectivity between said serving radio access network node and a core network is lost, support of packet data connectivity for public safety communications includes providing routing functions locally by said serving radio access network node to user equipments in the coverage of said serving radio access network node that are authorized to operate in said resilient mode,
determining if operation in said resilient mode is authorized; and,
when information is received indicating operation of said serving radio access network node in said resilient mode, and if operation in said resilient mode is authorized, starting to operate in said resilient mode.

7. The method according to claim 6, comprising:
receiving said information indicating operation in said resilient mode, in broadcast system information.

8. The method according to claim 6, comprising:
using credentials related to said operation in resilient mode, stored in a subscriber identification module associated with a user equipment.

9. The method according to claim 6, comprising:
reverting to a normal mode of operation in case connectivity between said radio access network node and core network is recovered.

10. The method according to claim 6, comprising:
using credentials related to said operation in resilient mode for authentication of an authorized user equipment.

* * * * *